Aug. 6, 1940.    A. F. HENNINGER, JR., ET AL    2,210,718
ELECTRICAL DISPLAY DEVICE
Filed April 26, 1937    2 Sheets-Sheet 1

Inventors.
ANDREW F. HENNINGER, JR.
GEORGE D. HENNINGER
By Zabel, Carlson & Wells
Attorneys.

Aug. 6, 1940.    A. F. HENNINGER, JR., ET AL    2,210,718
ELECTRICAL DISPLAY DEVICE
Filed April 26, 1937    2 Sheets-Sheet 2
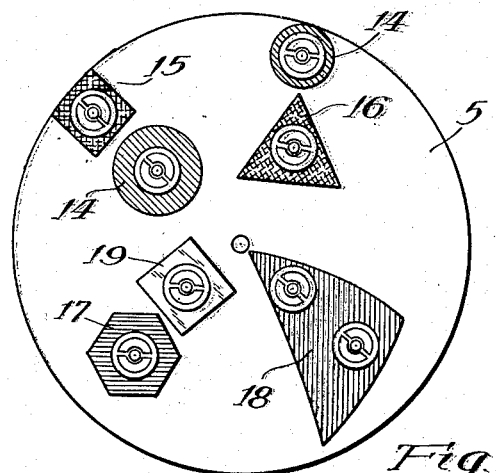
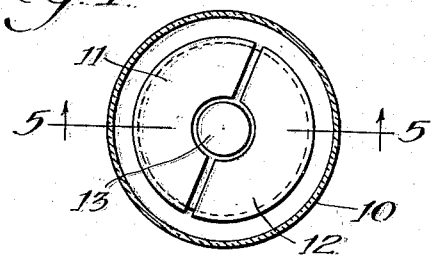
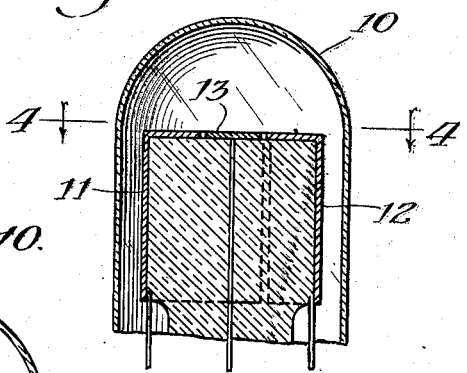
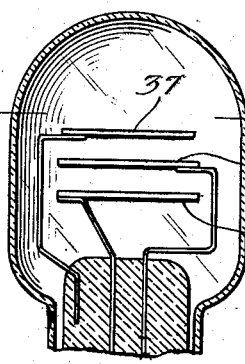
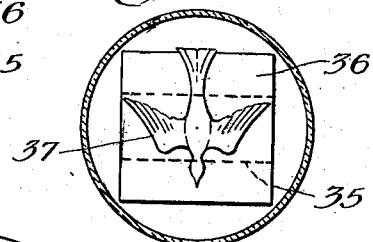
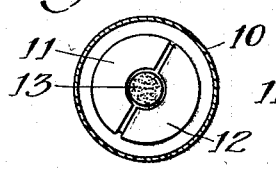
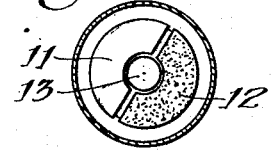
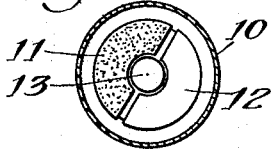
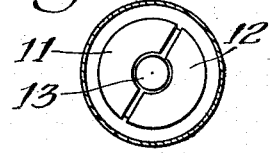
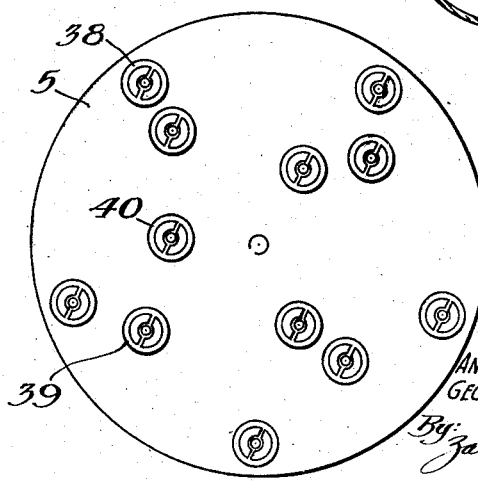
Inventors.
ANDREW F. HENNINGER, JR.
GEORGE D. HENNINGER
By Zabel, Carlson & Wells
Attorney Patented Aug. 6, 1940

2,210,718

UNITED STATES PATENT OFFICE 2,210,718

ELECTRICAL DISPLAY DEVICE

Andrew F. Henninger, Jr. and George D. Henninger, Chicago, Ill.

Application April 26, 1937, Serial No. 139,096

4 Claims. (Cl. 240—10.1)

The present invention relates to display devices and more particularly to display devices utilizing negative glow lamps in combination with a rotating support whereby to obtain variations in color and lighting effects to produce an interesting and attractive lighting display.

More particularly, the invention concerns itself with the combination of negative glow lamps energized from an alternating current source, with means whereby the glow lamps may be rotated at variable speeds over a range of speed which includes speeds of rotation which are multiples of the rate of illumination of the blow lamp by the alternating current source.

The invention contemplates the provision of a system of this character in which the intensity of illumination may be varied by varying the voltage impressed on the lamps, and in which the illuminating effect of the lamps may be varied by completely cutting off the power supply thereto for different intervals of time.

The invention further contemplates in this connection the rotation of negative glow lamps while the potential applied thereto is being shifted from one set of electrodes to another set of electrodes in the lamp to create variations in the visual effect.

In certain forms of the invention, it is also the purpose to provide in a combination of this character, means for blending colors and changing colors on the rotating display which means may be in the nature of different colored gas fillings for certain of the glow lamps or different colored backgrounds of variable shapes rotating with and forming backgrounds for the several glow lamps.

Other and more specific features and advantages of the invention will appear more clearly from the following description, reference being had to the accompanying drawings wherein—

Fig. 3 is a view in front elevation of the disk showing the application of various colored backgrounds to the several negative glow lamps;

Fig. 4 is a plan section through one of the negative glow lamps taken substantially on the line 4—4 of Fig. 5;

Fig. 5 is a longitudinal section through the glow lamp taken on the line 5—5 of Fig. 4;

Figure 1:
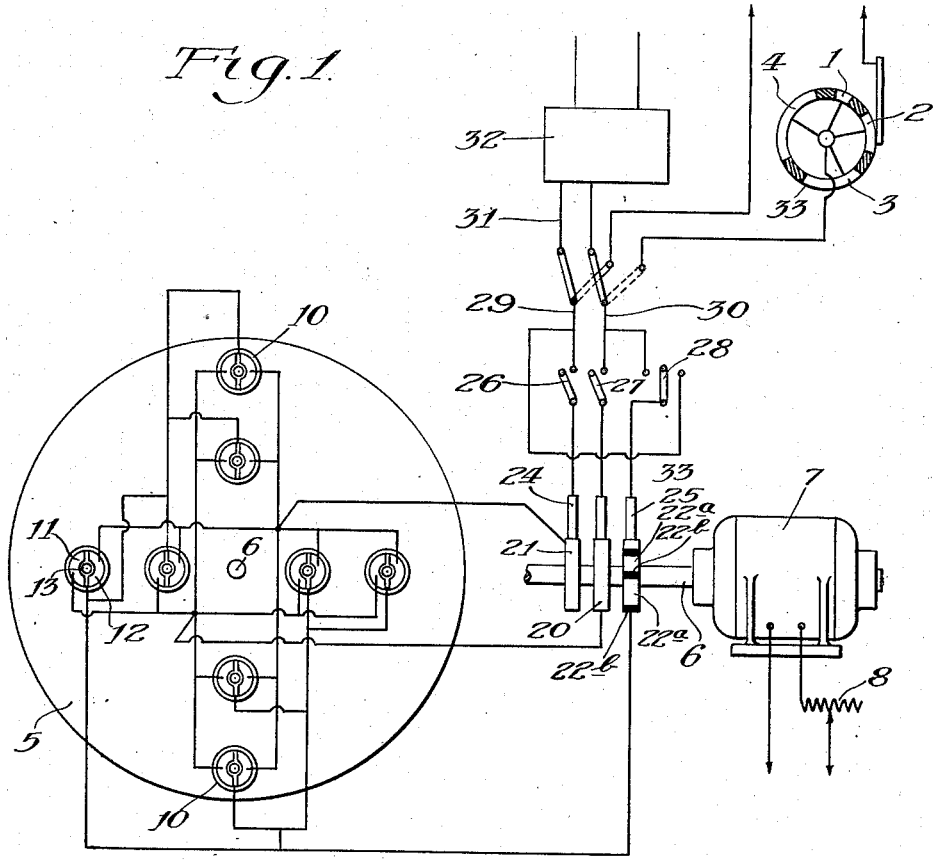
Fig. 1 is a somewhat diagrammatic view illustrating the several glow lamps mounted upon a rotating disk and the necessary electrical connections for producing the variations in illuminating effect.

Figs. 6, 7, 8, and 9 are end views of the electrodes in the glow lamp illustrating the several effects that can be produced by varying the connections shown in Fig. 1;

Fig. 10 is a longitudinal section through a modified form of glow lamp;

Fig. 11 is a sectional view on the line 11—11 of Fig. 10; and

Fig. 12 is a modified form of disk which may be employed.

Referring now in detail to the drawings, the invention is shown as embodied in a device comprising a support 5 which preferably is a disk of insulating material. The support 5 is carried by a shaft 6 of a motor 7. The motor 7 is of a variable speed type capable of having its speed varied over a wide range in any suitable manner such for example as by adjustment of a rheostat 8 provided in the motor circuit. The disk 5 has a plurality of sockets 9 adapted to receive glow lamps 10. As shown best in Fig. 1, the glow lamps are arranged in groups spaced at different radial distances from the axis of rotation of the disk 5. Two glow lamps are located in each group, as illustrated in Fig. 1, and the lamps of each group are diametrically opposite each other. Each lamp contains three electrodes 11, 12, and 13. As is well known in connection with glow lamps, the several electrodes may take various decorative shapes. For the sake of simplicity, we have shown the electrode 13 as a round disk, and the electrodes 11 and 12 as substantially semi-circular segments around the disk 13.

Means are provided whereby power may be supplied to energize the glow lamps and cause the electrodes to glow with the characteristic color of the gases contained therein. The several lamps preferably do not contain the same gases and, therefore, do not glow with the same colors. For example, one lamp may contain pure neon gas in which case the negative glow on the electrodes of this lamp will have the characteristic orange red color. Another lamp of this same group may have a filling of mercury vapor and argon or either of them to produce a characteristic blue or green negative glow. Alternatively, the several lamps of any particular group may have the same gas filling, and a different gas filling will be used for another group.

As shown in detail in Fig. 3, the disk 5 preferably is provided with reflecting backgrounds 14, 15, 16, 17, and 18 of different color and shape. For example, two circular backgrounds 14 are shown, and they may be colored green. Rectangular backgrounds 15 may be colored yellow. The triangular background 16 may be colored orange. The background 17 may be colored blue, and the background 18 may be colored red. We have also shown one background 19 in the form of a mirror, and this background is also rectangular, but is not colored. It is obvious, of course, that a large number of variations in the color and shape of backgrounds may be used.

The several glow lamps are energized by connecting them in parallel so that the lead from one electrode of each glow lamp connects to the lead from the same electrode of each other glow lamp. The electrodes 11 of each of the glow lamps are connected by a common lead to a conducting ring 20 carried by the shaft 6. Similarly, the electrodes 12 are connected to a conducting ring 21 carried by the shaft 6, and the electrodes 13 are connected to a ring 22 carried by the shaft 6. Brushes 23, 24, and 25 ride on the rings 20, 21, and 22, respectively. Connections are made through suitable switches 26, 27, and 28 to a pair of power leads 29 and 30. The power leads 29 and 30 may be connected by means of a switch 31 to a power amplifier 32 having a variable power output or to a circuit interruptor 33 adapted to break the circuit at different intervals to create a flashing effect.

When the power leads 29 and 30 are connected to the amplifier 32, the intensity of illumination of the glow lamps will respond to the potential impressed upon the electrodes. The power amplifier itself may receive its current input, for example, from the audio frequency output circuit of a radio receiver so that the intensity of glow in the glow lamps will vary in response to the intensity of signal transmitted by the radio receiver to the loud speaker. Now, however, when the switch 31 is shifted to connect the power leads 29 and 30 with the circuit interruptor 33, the glow lamps will be periodically darkened, and the segments of the circuit interruptor 33, as shown, are arranged to give a varying length of time on for the glow lamps. The segments 1, 2, 3, and 4 of the interruptor are separated by insulation and are so arranged that the segment 2 is twice as long as the segment 1. The segment 3 is three times as long as the segment 1, and the segment 4 is four times as long as the segment 1. The circuit interruptor 33 can be driven in any suitable manner, such for example as by a small motor and caused to interrupt the flow of current to the glow lamps at any desired rate. For example, if the circuit interruptor 33 is driven by a synchronous motor, it can be driven at such a rate that, while the brush of the interruptor is on the segment 1, the electrodes of the glow lamp will be illuminated only once. This is because the electrodes themselves are each illuminated only once for each cycle of alternating current. In such an arrangement, then the electrodes would each be illuminated twice while the brush of the interruptor 33 was crossing the segment 32, three times while the brush of the interruptor was crossing the segment 3, and four times while it was crossing the segment 4.

The ring 22, which cooperates with the brush 25 to supply potential to the electrodes 13, is preferably made of spaced conducting segments 22a separated by segments of insulation 22b. The switch 28 permits the brush 25 to be connected in parallel with either brush 23 or brush 24, and the switches 26 and 27 enable the operator to cut out either brush 23 or 24 at will.

In Figs. 6, 7, 8, and 9, the different combinations of illumination with the electrodes 11, 12, and 13 are illustrated. For example, if the switch 28 is open, the electrode 13 will remain dark while the electrodes 11 and 12 will be illuminated alternately on each half cycle of alternating current. If on the other hand the switch 26 is open and the switch 28 is closed, then the electrodes 11 and 13 will glow, and the electrode 12 will be dark. This is the arrangement when the switch 28 is closed in such a fashion as to connect the power lead 29 to the brush 25 while the power lead 30 is connected to the brush 23. When the power lead 29 is connected to the brush 24 and the power lead 30 is connected through the switch 28 to the brush 25 with the switch 27 being open, then the electrode 11 will remain dark, and electrodes 12 and 13 will glow. If both switches 26 and 27 are closed and the switch 28 is closed to connect it to either power lead 29 or power lead 30, then the condition shown in Fig. 9 will prevail, that is, all three electrodes will actually glow, the electrode 13 glowing at the time the electrode with which it is connected in parallel glows.

In Figs. 10 and 11, a slightly modified form of glow lamp is disclosed in which electrodes 35 and 36 are adapted to be connected to a source of current supply, and a figure 37 is supported in front of the electrode 36 so as to appear as a dark silhouette in front of the glowing electrode 36. In this form, the electrode 36 is made large enough to form a background for the silhouette 37 and to hide the electrode 35 when the tube is viewed from the end, as shown in Fig. 11.

The rotation of the disk 5 at variable speeds enables the operator to bring the speed of the disk up to a multiple of the frequency at which the lamps are excited. On a 60 cycle alternating current, each electrode 11 and 12, when they are connected in circuit, will be illuminated 60 times a second. Therefore, if the disk rotates 15 times per second, for example, each electrode will be illuminated 4 times in each rotation of the disk, and these illuminations will occur at the same spot in the circumference of the disk. Since there is one electrode illuminated on each half wave of the alternating current, each individual lamp will produce 8 flashes around the path of travel of the disk. As the speed of the disk changes, the positions at which the glow or illuminations of the electrode appear will vary, and in this way travelling effects are created for each group of lamps. At certain speeds, the light effect will appear to be travelling in one direction, while, upon an increase in speed, it will reverse itself and appear to be travelling in the opposite direction. Also, in starting up from a slow speed when the lamps are arranged as shown in Fig. 1, the illusion is created that there are only two radially spaced groups and that these groups move in a sort of elliptical path. This simply means that the two outer groups are seen by the eye together, while the two inner groups are seen by the eye as a single rotating group.

Figure 2:
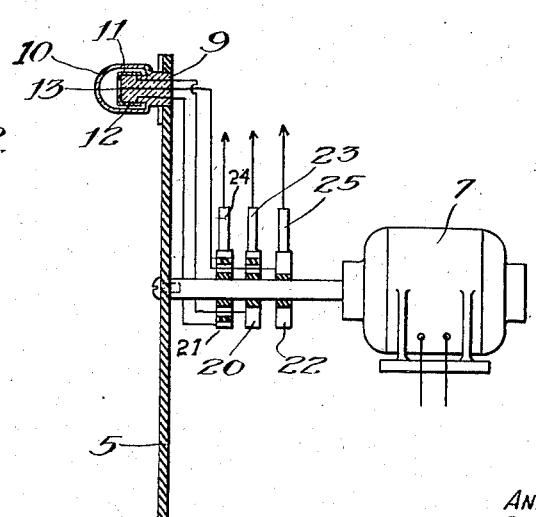
Fig. 2 is a longitudinal sectional view through the device illustrating the mechanical construction of the disk and its connection to the motor.

In Fig. 1, the angular spacing of the lamps is the same for all groups. That is, the two lamps of each group are diametrically opposed. In Fig. 2, however, one group of lamps consists of the lamps in front of the backgrounds 14 and 15. Obviously, the angular spacing of these lamps is not the same when one considers the direction of rotation. Similarly, the next group inwardly consists of the blue and red combination backed by the background 17 and 18 and again this angular arrangement is different.

Also, in Fig. 12 we have shown a further modification in the angular positioning of the lamps while maintaining the radial grouping thereof. An outer radial group 38 is composed of five lamps. A second group 39 is composed of four lamps, while an inner group 40 is composed of three lamps. Thus the angular spacing of the outer group, although regular, is 72 degrees. The angular spacing of the group 39 is 90 degrees, while the angular spacing of the group 40 is 120 degrees. If the disk 5 be rotated with the lamps grouped, as shown in Fig. 12, at a speed of 60 revolutions per second, then the lamps 40 will always be illuminated in the same spot and will appear as three stationary lighted points on the disk. This will also be the case if the speed is reduced to one-third or 20 rotations per second. However, at 20 rotations per second, the lamps 39 will not appear as stationary spots, nor will the lamps 38 appear to be stationary. Thus, as the speed of rotation of the disk 5 is varied, many interesting and different combinations of effects are produced. This is due to the combination of the alternating flashing or glowing electrodes with the rotation of the disk.

While certain forms of the invention have been shown and described, it is obvious that it is capable of many modifications. Changes, therefore, may be made in the construction and operation without departing from the scope of the invention as defined in the claims in which it is our intention to claim all novelty inherent in the invention as broadly as possible in view of the prior art.

Having thus described our invention, what we claim as new and desire to secure by Letters Patent is:

1. In a display device of the character described, a rotatably mounted support, a plurality of negative glow lamps mounted on said support at different distances from the axis of rotation thereof, said glow lamps all facing in the same direction, means for rotating said support and lamps, and means for supplying alternating current to said lamps while they are rotating, said lamps having more than two electrodes, and said last named means including manually selectable electrical connections for energizing any two of the electrodes of each lamp.

2. In a display device of the character described, a rotatably mounted support, a plurality of negative glow lamps mounted on said support at different distances from the axis of rotation thereof, said glow lamps all facing in the same direction, variable speed means for rotating said support and lamps, said lamps having three electrodes each and current supply means for said lamps including electrical connections for energizing any two of the electrodes of each lamp.

3. In a display device of the character described, a rotatably mounted support, a plurality of negative glow lamps mounted on said support at different distances from the axis of rotation thereof, said glow lamps all facing in the same direction, variable speed means for rotating said support and lamps, said lamps having three electrodes each and current supply means for said lamps including electrical connections for energizing any two of the electrodes of each lamp, said current supply means including also means for varying the potential impressed upon said lamps.

4. In a display device of the character described, a rotatably mounted support, a plurality of negative glow lamps mounted on said support at different distances from the axis of rotation thereof, said glow lamps all facing in the same direction, variable speed means for rotating said support and lamps, said lamps having three electrodes each and current supply means for said lamps including electrical connections for energizing any two of the electrodes of each lamp, said current supply means including an interrupter, said interrupter having means to vary the periods of illumination of said lamps according to a predetermined cycle.

ANDREW F. HENNINGER, Jr.
GEORGE D. HENNINGER.